United States Patent
Hein et al.

(10) Patent No.: US 6,511,342 B1
(45) Date of Patent: Jan. 28, 2003

(54) MODULAR INSTRUMENT PANEL SYSTEM HAVING A FLAT FLEXIBLE BUS

(75) Inventors: David A. Hein, Sterling Heights, MI (US); David J. Berels, Plymouth, MI (US); Arthur W. Hess, Novi, MI (US); Jack S. Palazzolo, Dearborn, MI (US); Michael J. Hier, Royal Oak, MI (US); John P. Slaven, Harper Woods, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/519,815

(22) Filed: Mar. 6, 2000

Related U.S. Application Data
(60) Provisional application No. 60/149,323, filed on Aug. 17, 1999.

(51) Int. Cl.[7] .............................................. H01R 11/00
(52) U.S. Cl. ..................................... 439/502; 307/10.1
(58) Field of Search ................................ 439/502, 503, 439/504, 505; 307/10.1, 9.1

(56) References Cited

U.S. PATENT DOCUMENTS

| | | | |
|---|---|---|---|
| 5,324,203 A | | 6/1994 | Sano et al. .................... 439/34 |
| 5,508,689 A | | 4/1996 | Rado et al. ............. 340/825.06 |
| 5,610,454 A | * | 3/1997 | Nishikawa et al. .......... 307/147 |
| 5,623,169 A | * | 4/1997 | Sugimoto et al. .......... 307/10.1 |
| 6,249,060 B1 | * | 6/2001 | Osha ......................... 307/10.1 |
| 6,291,770 B1 | * | 9/2001 | Casperson ................. 174/72 A |
| 6,327,263 B1 | * | 12/2001 | Nakatsuji .................... 370/442 |

FOREIGN PATENT DOCUMENTS

| | | |
|---|---|---|
| EP | 0 281 376 | 9/1988 |
| WO | WO 98/31118 | 7/1998 |

OTHER PUBLICATIONS

"Visteon Innovations Superintegration" Brochure; Publication date unknown.

* cited by examiner

Primary Examiner—Brian Sircus
Assistant Examiner—Michael C. Zarroli
(74) Attorney, Agent, or Firm—Bill C. Panagos

(57) ABSTRACT

A configurable instrument panel design is provided that integrates component designs so that an instrument panel can be configured for a specific vehicle content as late in the vehicle assembly process as possible. An electrical system is provided that utilizes a flat flexible cable that is the same for every vehicle independent of vehicle content. Electronic modules are provided with connectors that only connect to the specific wires required for a particular module. A plurality of different multiplexing links are built-in to the electrical system and wiring arrangement allowing the system to be universal across all possible instrument panel configurations. This allows the system to accommodate lower option vehicles at a lower cost than conventional technology. Thin smart switch units can be installed at a final stage in the instrument panel assembly process to configure the feature content of the instrument panel. Features that can be configured include selecting between different types of audio system, climate control system, and integrated instrument panel, all without customizing the electrical system and wiring arrangement.

7 Claims, 4 Drawing Sheets

MODULAR INSTRUMENT PANEL SYSTEM HAVING A FLAT FLEXIBLE BUS

CROSS-REFERENCE TO RELATED APPLICATIONS

This application claims the benefit of U.S. provisional application Serial No. 60/149,323, filed Aug. 17, 1999, which is incorporated by reference herein.

TECHNICAL FIELD

The present invention generally relates to vehicle instrument panels, and more particularly to an integrated instrument panel design incorporating an improved wiring harness and electronic component design.

BACKGROUND ART

An instrument panel is the primary driver interface in a vehicle, and operates to provide information to the driver as well as receive various inputs from the driver. Displays and gauges provide information to the driver for everything from speed to the volume on a radio. The location and visibility of these displays can even effect vehicle safety and driver comfort. In addition, some displays can be provided which present additional information such as a display for rear vision cameras. On the receiving side, the switches in the instrument panel control greater than 90% of the functions of the vehicle.

An instrument panel also functions as a key component to the interior design of a vehicle. The instrument panel determines an interior personality of the vehicle. Through the selection of surface material and contour as well as types of displays and switches, the interior style can change from a sophisticated luxury vehicle to a muscle car. Because of this importance to interior style, a need exists for an instrument panel having a flexible design architecture that readily supports change in features and configuration to provide a vehicle original equipment manufacturer (OEM) with the ability to produce different vehicle brands and create niche vehicles.

For an instrument panel to be accepted by an OEM, it must meet vehicle cost targets. The instrument panel needs to be cost effective not only on a high option vehicle, but also across an entire range of vehicle options. Although integration of electrical, electronic, and mechanical components can reduce cost due to elimination of parts and labor, an integrated system can also have a detrimental impact on give-away and repair cost. More specifically, in order to be cost effective on a low option vehicle, conventional electrical systems are provided with a minimum amount of wiring and electronics on the vehicle. "Give-away content" results from manufacturers building-in design support flexibility by integrating high end functions into a low content vehicle's base electronics and wiring. In other words, modules or wiring are placed on vehicles independent of whether a particular vehicle will ultimately include higher end features. In order to create a system that is cost effective on a low end vehicle, give-away content needs to be minimized.

Therefore, a need exists for an instrument panel design having a wiring harness and electronic components and system that is able to cost effectively overcome each of these problems.

DISCLOSURE OF INVENTION

It is therefore an object of the present invention to provide an instrument panel (IP) electronic and electrical system that addresses the above needs by providing the following enumerated features.

A flat flexible wire arrangement is used in place of a conventional type of wire harness. Conventional wiring harnesses only provide a link or connection to one of a possible number of different types of multiplexing arrangements. The flat flexible wire arrangement of the present invention is universal to vehicle applications by providing a link to a plurality of possible multiplexing links irrespective of vehicle type or instrumentation features, optimizes system functions, and reduces total system cost and weight.

Electronics that are integrated into components such as switches, smart switches and a junction box to reduce overall instrument panel wiring and components while maintaining conventional low cost serviceability. The integration of the instrument panel electronics also reduces the total number of connectors and terminals while improving package efficiency.

An electrical system that provides a configurable instrument panel by supporting installation of thin smart switch units at a final stage in the assembly process to configure the feature content of the instrument panel. Features that can be configured include audio system, climate control system, exterior lighting and more. All configuration of the features in the instrument panel can be completed in a "Just-In-Time" assembly plant within minutes.

A system that is easily upgraded by allowing features such as an automobile personal computer (Auto PC), CD player, and automatic headlamps to be changed at a dealer location, or easily reconditioned after a vehicle is returned from a lease.

A configurable instrument cluster arrangement in conjunction with the flat flexible wire arrangement, wherein the cluster arrangement is formed from individual plug-in modules or gauges to allow easy configuration of the instrument cluster for regional and vehicle content without the need for a customized wiring harness and electrical system for each configuration.

In accordance with these and other objects, the present invention provides a configurable electrical system for a vehicle instrument panel having a plurality of electrical components mounted to the instrument panel, and a plurality of different multiplex links, each multiplex link allowing the plurality of electrical components to be connected to a selected type of multiplex circuit based on a built-in processing capability of a particular electrical component. A flat flexible cable is located within the instrument panel and connects each of the plurality of electrical components to associated electrical devices or controllers. The flat flexible cable provides a connection to each of the plurality of different multiplex links irrespective of a selected configuration of the electrical system Thus, the present invention supports a configurable instrument panel design by providing integration of electronic component designs so that an instrument panel can be configured for a specific vehicle content as late in the vehicle assembly process as possible. For example a vehicle can have any one of the following headlamp switches: (1) headlamps; (2) headlamps with auto lamps, (3) headlamps with fog lamps; and (4) headlamps with auto lamps and fog lamps. On a typical vehicle, a change in the headlamp switch, wiring and the bezel in the instrument panel are required to change between these available switch types.

In accordance with one aspect of the present invention, the electrical system, flat flexible cable, and main wiring system is the same for every vehicle independent of vehicle content. A particular selected electronic module only connects to the specific wires required for operation. Thin smart switch units can be installed at a final stage in the instrument panel assembly process to configure the feature content of the instrument panel. Features that can be configured include selecting between different types of audio system, climate control system, and integrated instrument panel.

These and other advantages of the present invention will become apparent to one of ordinary skill in the art in light of the following description and attached drawings.

BEST MODE FOR CARRYING OUT THE INVENTION

Figure 1:
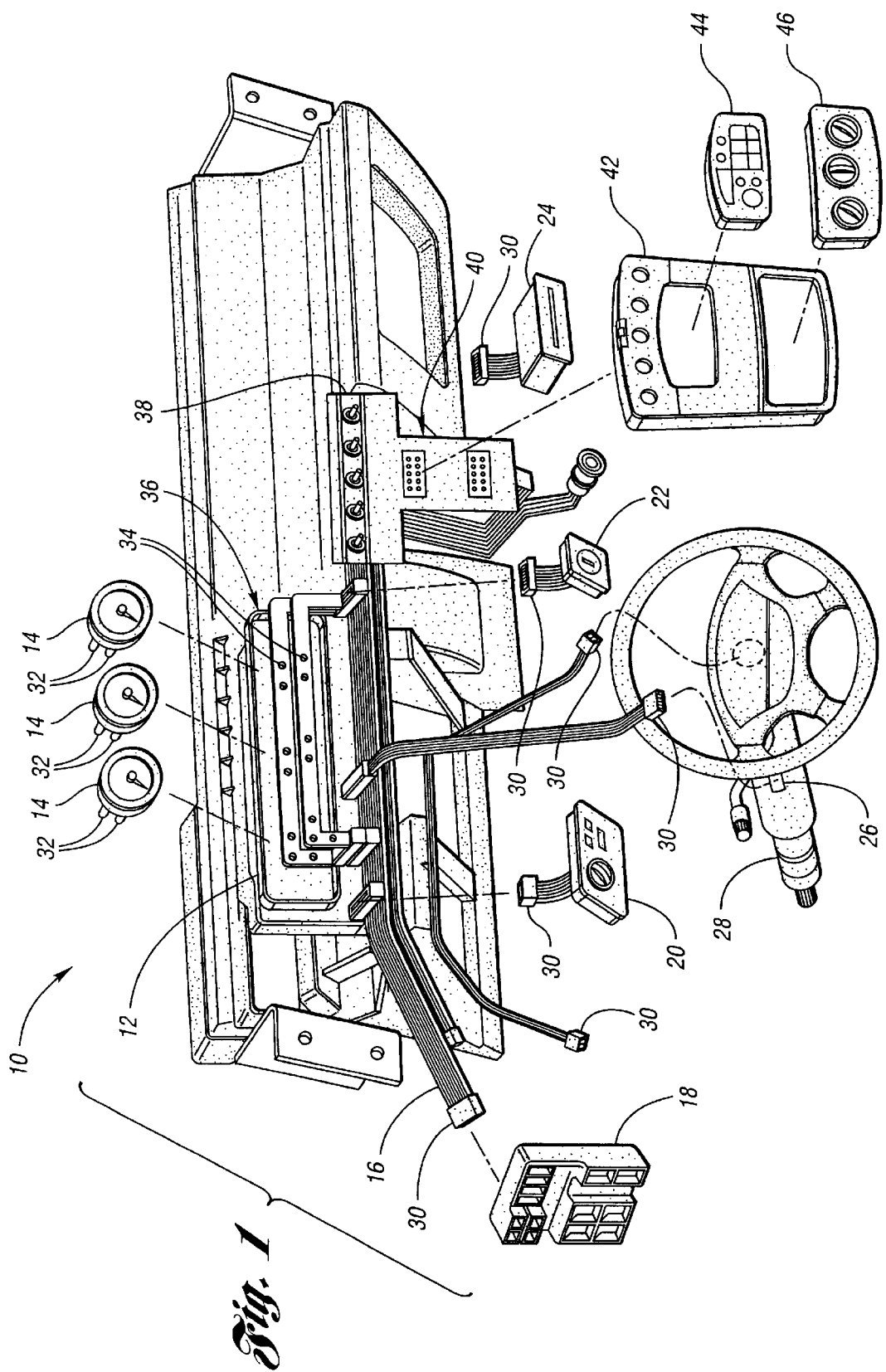
FIG. 1 is an exploded diagram of a configurable and integrated instrument panel having an electronics and electrical system in accordance with the present invention.

Referring to FIG. 1, a configurable instrument panel 10 in accordance with the present invention includes a wiring and electronics system provided by a generic instrument gauge/display cluster subcomponent 12 arranged to receive one or more separate modular gauges 14, a flat flexible cable (FFC) 16 that is generic for all potential configurations of the instrument panel and electronic components, a smart junction box 18, and a set of electronic modules such as a headlamp switch 20, ignition switch 22, CD player 24, and multi-function switch 26 located on a steering column 28. Each module connects to FFC 16 using an appropriately configured quick-connect type connector 30.

Regarding the electronic components of instrument panel 10, each connector 30 is also selectively configured to allow a particular module to be connected to appropriate wires provided by FFC 16 depending on the type and features of a selected module. In accordance with the present invention, FFC 16 is arranged to be uniform to all potential configurations of the instrument panel and electronic components. As a result, each module can be substituted for a module having different features or function, and still be connected to the same FFC 16.

Examples of possible electronic modules include a center stack 38 that can be provided on instrument panel 10 via a flexible circuit board 40 having appropriate switches integrated therein. A detachable outer cover 42 supports mounted CD player 24 as well as a modular radio control unit 44 and HVAC control unit 46. In addition, ignition switch module 22 can be provided having low current switches and integrated theft prevention electronic control capability. Headlamp switch unit 20 can be used having low current switches and integrated electronic controls. Multi-function switch 26 can include a switch assembly arranged to control operation of the vehicle's turn signals, wiper/washer, headlamp high beam selection, as well as providing a connection for a driver side air bag (not shown).

With respect to the instrument cluster, each of the individual gauge and display modules of the instrument cluster are connected using a pin style connector 32 that is uniform to all possible modules. These pins mate with an associated receiving socket 34 that connects to FFC 16. The type and features of a given instrument cluster module determine which of the respective pins 32 are made "live," i.e., connected to a circuit element in the module. The use of a universal pin connector and receiving socket arrangement, in connection with FFC 16 as described more fully below, allows easy substitution and upgrade of the instrument cluster as the vehicle is being assembled.

The instrument cluster further includes an instrument cluster housing or can 36. In a preferred embodiment, instrument cluster housing 36 is integrally molded as part of a plastic cross car beam. However, this is not to be construed as limiting as the instrument cluster can be formed using a separate housing. A connector and wiring arrangement, such as a printed circuit board having the receiving sockets soldered thereto, is mounted within an opening formed in the instrument cluster can. The opening allows insertion and connection of the respective instrument cluster modules. Examples of such modules include a speedometer, tachometer, fuel, oil pressure, temperature gauge, as well as ELD or other types of video displays and gauges. The FFC is then preferably positioned within the instrument panel behind the cluster housing 36, and the housing includes apertures through which crimps or sockets 34 can extend for receiving pins 32 of a particular cluster module. Snaps (not shown) may also be provided to hold the modules/gauges in position within the cluster housing.

The integrated electrical system of the present invention is cost effective on a low option vehicle while also providing support for easy upgrade to high option vehicles. More specifically, the present invention provides a cost effective capability on a low option vehicle by minimizing the amount of wiring and electronics of the base electrical system architecture needed to allow simple substitution or addition of a particular electronic instrument panel module or instrument cluster module. As described below, the electrical system of the present invention allows all potential vehicle instrument panel configurations and feature packages to automatically include the wiring and control capability that allows higher-level option modules to be simply plugged-in to the desired opening in the instrument cluster or instrument panel.

The electrical system architecture of the present invention includes a plurality of different multiplex links used in the industry based on the sophistication and processing capability of a particular electronic device. More specifically, in a preferred embodiment, three separate multiplex links are built-in to the FFC and electrical system to reduce system give-away content. For example, a base local multiplex link 50 connects smart junction box 18 located on an A-pillar to a series of switches, smart switches, displays, and actuators. Communication between the electronic devices is controlled by the local multiplexing link in such a lowest option/base configuration vehicle. An ITS Data Bus (IDB) link 60 is used for electronic components typically offered in the highest option vehicles. IDB links are commonly used to link after-market products into an existing electrical system. Medium option vehicles can utilize a built-in Body multiplexing link 70 which allows communication control through a centralized vehicle controller.

The local multiplex link allows smart switches, displays and actuators to be implemented with low cost electronics. Such components can be implemented without a microprocessor as part of the circuit. The local multiplex link also enables a reduction in wiring as well as allowing upgrade or addition of features into a vehicle at minimum cost.

Figure 2:
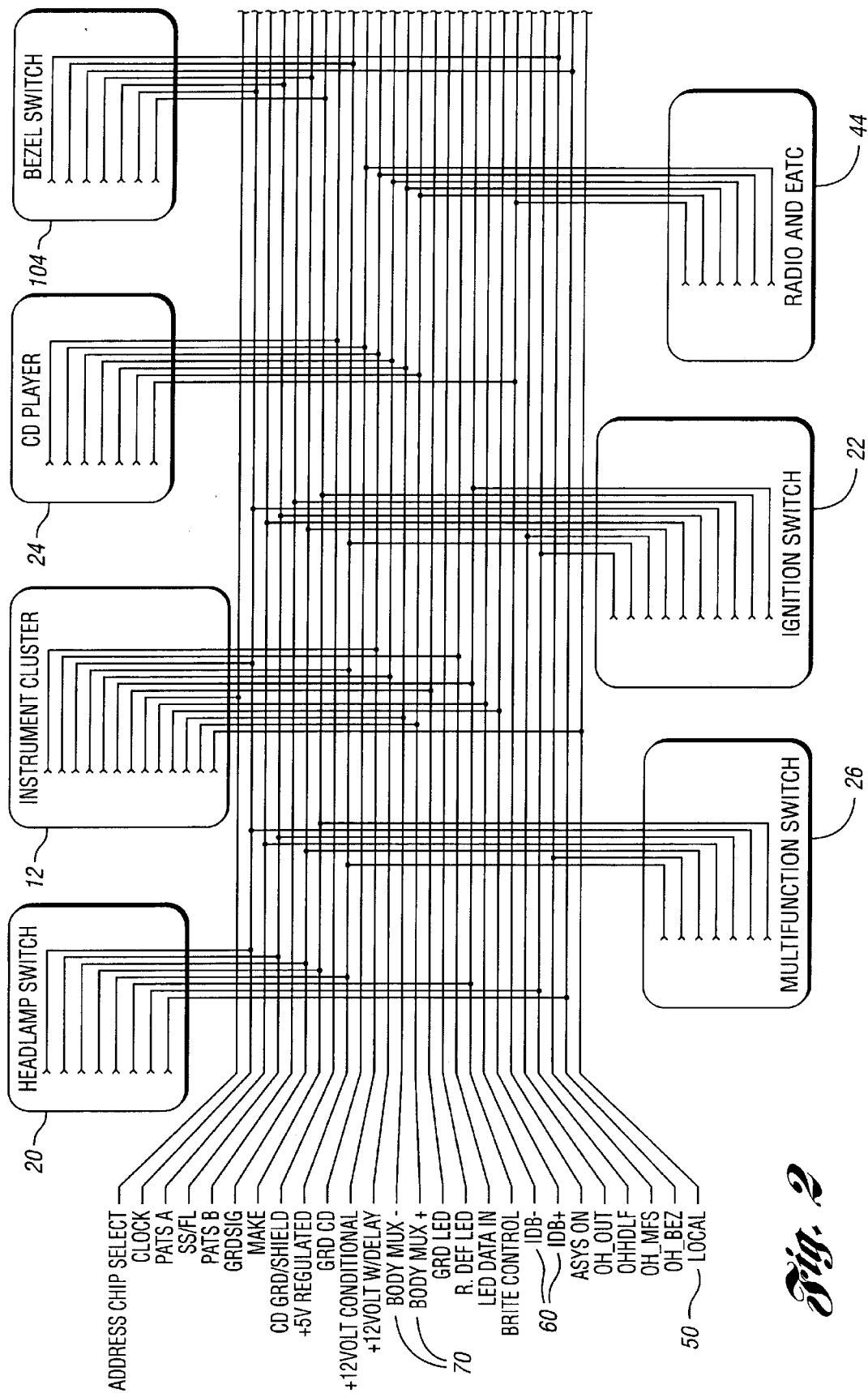
FIG. 2 is a representation of a flat flexible wiring harness in accordance with an exemplary embodiment of the present invention.
Figure 3:
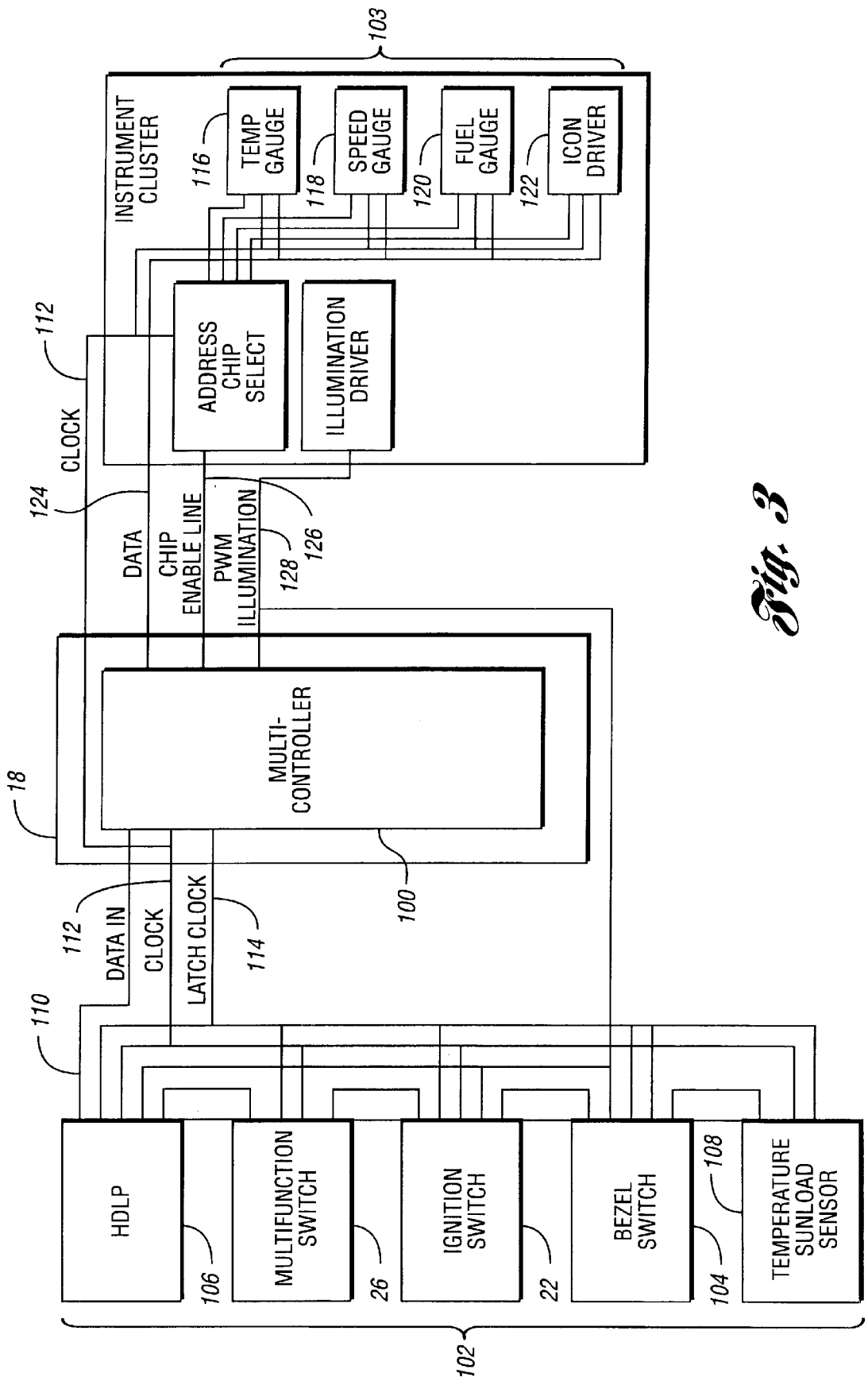
FIG. 3 is a block circuit diagram of a base electronics configuration in accordance with one embodiment of the present invention.

The smart switches, displays, and actuators are connected to the smart junction box 18 through FFC 16. FIG. 2 illustrates an exemplary layout and connection diagram of FFC 16 in accordance with this invention. The FFC connects common signals between all the devices. Using the three separate multiplexing circuits, a 40 circuit FFC as shown in FIG. 3 replaces more than 170 circuits of wiring that would be needed in a conventional wiring system. Thus, the FFC harness of the present invention dramatically reduces wiring cost and weight, while also providing uniformity for all vehicle option packages.

A block circuit diagram is shown in FIG. 3 for the lowest options/base wiring configuration of the present invention. In this embodiment, a microcontroller 100 is located at smart junction box 18, and is connected to various input devices 102, such as ignition switch 22, multi-function switch 26, a bezel switch 104, an HDLP 106, and various temperature sensors 108, via a data-in line 110, a clock line 112, and a latch clock line 114. Various output devices 103, such as a set of gauges/electronic displays 14 in instrument cluster 12, e.g. a temperature gauge 116, speedometer 118, fuel gauge 120, and an icon driver 122 for a display device, are connected to microcontroller 100 via a data line 124 and a chip enable/address line 126. An illumination line 128 allows power for illumination of desired input and output devices. Construction and operation of each of the devices is understood by one of ordinary skill in the art.

Figure 4:
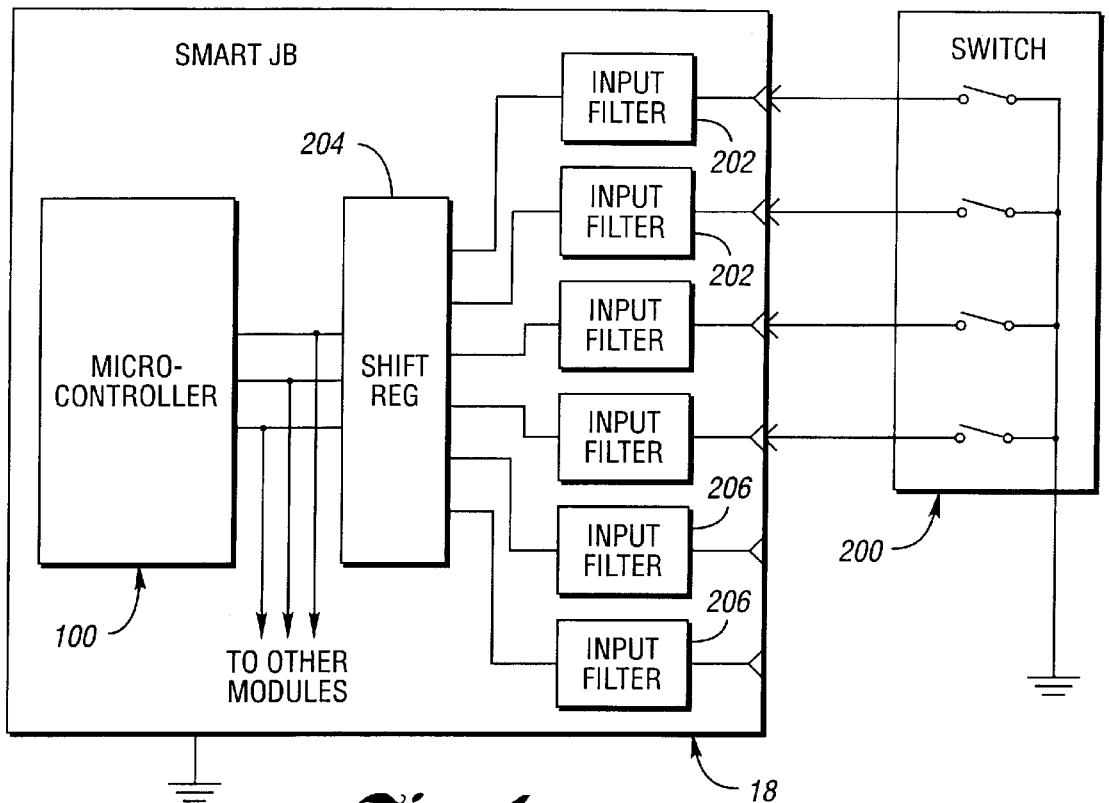
FIG. 4 is a block circuit diagram of smart junction box and switch arrangement.

Referring now to FIG. 4, a block circuit diagram is provided showing connection of a conventional electronic control switch module 200 to the microcontroller. In this configuration, a set of input filters 202 and a shift register 204 are provided in smart junction box 18 to facilitate input of signaling from the switch module. A processing capacity can be built-in by incorporating one or more additional filters 206.

Figure 5:
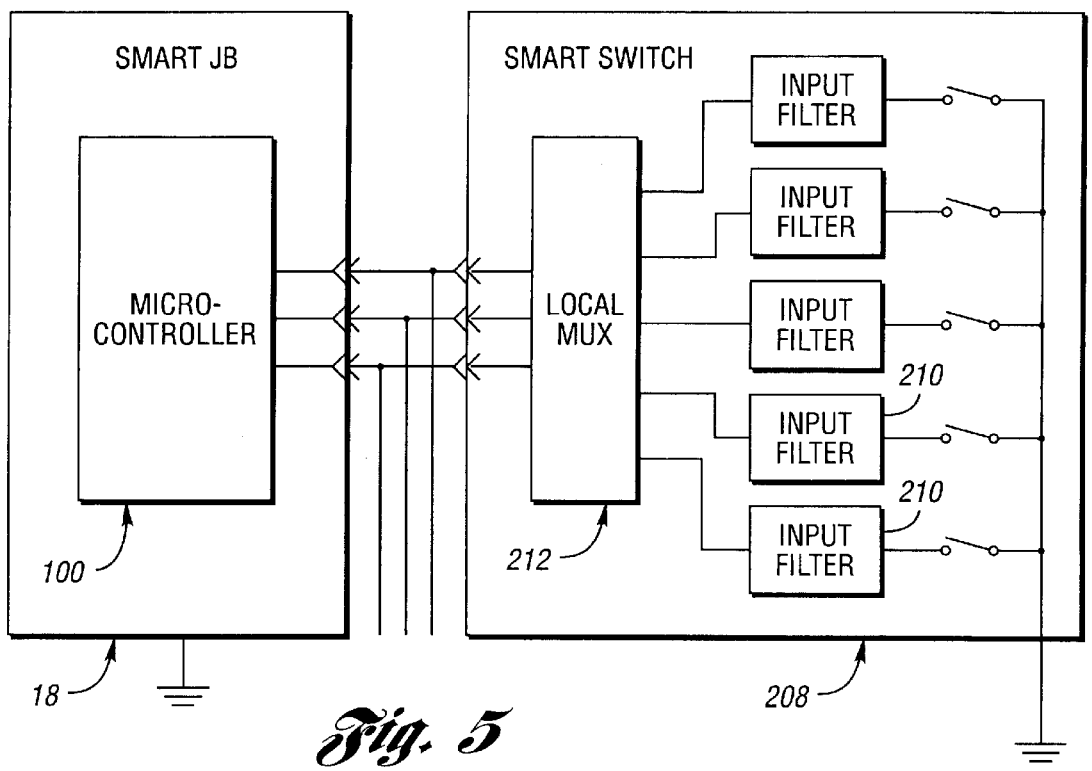
FIG. 5 is a block circuit diagram of smart junction box and smart switch arrangement.

An alternative arrangement is shown in the block circuit diagram of FIG. 5. In this arrangement, a smart switch module 208 is provided having local input filters 210 and a local multiplexer 212 incorporated therein. The multiplexer is then directly connected to the microcontroller via the FFC. The placement of the multiplexer in the smart switch advantageously reduces the number of individual wires required by the electrical system. This is shown by contrasting the number of wires connecting switch cluster module 200 with the number of wires connecting switch module 208.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A configurable electrical system for a vehicle instrument panel comprising:

a plurality of electrical components mounted to the instrument panel;

a plurality of different multiplex links, each multiplex link allowing the plurality of electrical components to be connected to a selected type of multiplex circuit based on a built-in processing capability of a particular electrical component; and a flat flexible cable located within the instrument panel for connecting each of the plurality of electrical components to associated electrical devices or controllers, wherein the flat flexible cable provides a connection to each of the plurality of different multiplex links irrespective of a selected configuration of the electrical system;

wherein the plurality of multiplex links comprises a separate link to one of three different multiplex circuit arrangements.

2. A configurable electrical system for a vehicle instrument panel comprising:

a plurality of electrical components mounted to the instrument panel;

a plurality of different multiplex links, each multiplex link allowing the plurality of electrical components to be connected to a selected type of multiplex circuit based on a built-in processing capability of a particular electrical component; and a flat flexible cable located within the instrument panel for connecting each of the plurality of electrical components to associated electrical devices or controllers, wherein the flat flexible cable provides a connection to each of the plurality of different multiplex links irrespective of a selected configuration of the electrical system;

wherein the plurality of multiplex links comprises an ITS Data Bus (IDB) multiplexing link arranged to connect a set of high level electronic components to the electrical system.

3. A configurable electrical system for a vehicle instrument panel comprising:

a plurality of electrical components mounted to the instrument panel;

a plurality of different multiplex links, each multiplex link allowing the plurality of electrical components to be connected to a selected type of multiplex circuit based on a built-in processing capability of a particular electrical component; and a flat flexible cable located within the instrument panel for connecting each of the plurality of electrical components to associated electrical devices or controllers, wherein the flat flexible cable provides a connection to each of the plurality of different multiplex links irrespective of a selected configuration of the electrical system;

wherein the plurality of multiplex links comprises a local multiplex link arranged to connect a set of base level electronic components to the electrical system, a built-in vehicle multiplexing link arranged to connect a set of mid level electronic components to the electrical system, and an ITS Data Bus (IDB) multiplexing link arranged to connect a set of high level electronic components to the electrical system.

4. A configurable electrical system for a vehicle instrument panel comprising:

a plurality of electrical components mounted to the instrument panel;

a plurality of different multiplex links, each multiplex link allowing the plurality of electrical components to be connected to a selected type of multiplex circuit based on a built-in processing capability of a particular electrical component; and a flat flexible cable located within the instrument panel for connecting each of the plurality of electrical compo nents to associated electrical devices or controllers, wherein the flat flexible cable provides a connection to each of the plurality of different multiplex links irrespective of a selected configuration of the electrical system;

wherein one of the electronic components comprises a control module having a plurality of switches, each of which are connected to a separate input filter, said control module further having a local multiplexer for coupling output signals from the plurality of switches to the flat flexible cable.

5. A configurable electrical system for a vehicle instrument panel having several possible configurations, the configurable electrical system comprising:

one of the electrical components mounted to the instrument panel; and a flat flexible cable located within the instrument panel comprising a plurality of multiplex links capable of handling different configurations wherein each multiplex link forms a unique multiplex circuit to which an electrical component may be electrically attached to depending on the particular configuration sought.

6. The configurable electrical system of claim 5 wherein the flat flexible cable comprises three different multiplex links for configuring the electrical system for base level, mid-level and high level electrical components.

7. The configurable electrical system of claim 5 wherein one of the electrical components comprises a control module having a plurality of switches, each of which are connected to a separate input filter, the control module, further having a local multiplexer for coupling output signals from the plurality of switches to the flat flexible cable.

* * * * *